Nov. 5, 1963 E. I. LYNCH ETAL 3,109,955
CATHODE RAY TUBE SYSTEM USING SECONDARY
EMISSION INDEXING SIGNALS
Filed Sept. 19, 1960

INVENTORS:
EDWARD I. LYNCH,
THOMAS T. TRUE,
BY Joseph Levinson
THEIR ATTORNEY.

United States Patent Office 3,109,955
Patented Nov. 5, 1963

3,109,955

CATHODE RAY TUBE SYSTEM USING SECONDARY EMISSION INDEXING SIGNALS

Edward I. Lynch, Syracuse, and Thomas T. True, Camillus, N.Y., assignors to General Electric Company, a corporation of New York Filed Sept. 19, 1960, Ser. No. 57,021
3 Claims. (Cl. 315—12)

Figure 1:
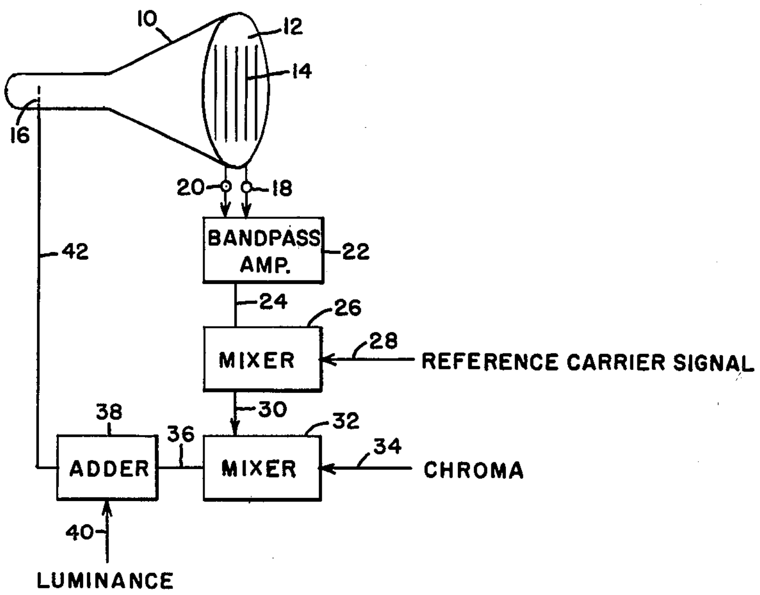

This invention relates to cathode ray tube systems in which an indexing signal is used to correlate the modulation of the electron beam with the position of impingement of the beam on the tube face and, more particularly, to an improved circuit and tube structure for the generation of an indexing signal.

The art is familiar with proposed color television image representation systems in which a plurality of laterally displaced triads are imprinted on the tube face. Each triad consists of three vertical phosphor stripes producing light of a different primary color in response to electron beam impingement thereon.

As the beam is swept horizontally across the vertical triads, the writing beam is modulated in accordance with the color content of the video information to generate an image in color on the tube screen. For proper color rendition the beam must be modulated in accordance with the content of each primary color at that time when the beam is impinging upon the phosphor stripe of the corresponding color. The non-linearities inherent in the sweep rate and irregularities in the position of printing of the color triads on the screen of the picture tube make necessary a system for correlating the impingement position of the beam and the beam modulation throughout the entire scanning raster.

For such correlation, the art has proposed generation of a signal, referred to as an index signal, having a measurable characteristic related to the impingement position of the electron beam on the tube face. For example, a conductive comb could be positioned to intercept the writing beam or an auxiliary pilot beam and thus generate an index signal as the beam is swept across the comb teeth during scanning. The phase information contained in the index signal may then be employed to control the time of application of the video modulation of the beam to ensure correspondence between the color content of the beam modulation and the position of impingement of the beam.

Unfortunately, it is difficult to derive an index signal of the desired amplitude from such arrangements. The signal amplitude may be increased by secondary emission from the comb. However, the arrangements known to the art have not been satisfactory due to distortion of the phase information when secondary emission effects are used.

It is, therefore, a primary object of this invention to provide an improved arrangement to generate an index signal using the secondary emission from a comb, the teeth of which intercept the electron beam.

In accordance with this object, there is provided, in a preferred embodiment of this invention, a first and second comb of thin, electron-permeable, material imprinted on the color triads carried on the face of a cathode ray tube. The teeth of the first and second comb are interleaved. A circuit is provided to bias one comb structure relative to the other comb structure to establish the first comb structure as the emitter and the other comb structure as the collector comb. Means are also provided to derive the index signal from the emitter comb as the secondary emission current caused by the interception of the scanning electron beam. The index signal may then be used for modulation control of the writing beam to ensure correspondence between the color modulation and the position of impingement of the electron beam on the tube face. By this arrangement, a higher indexing signal amplitude may be derived. In addition, the transit time from comb to comb is both short and constant so that the output signal is properly representative of the position of beam impingement.

Figure 2:
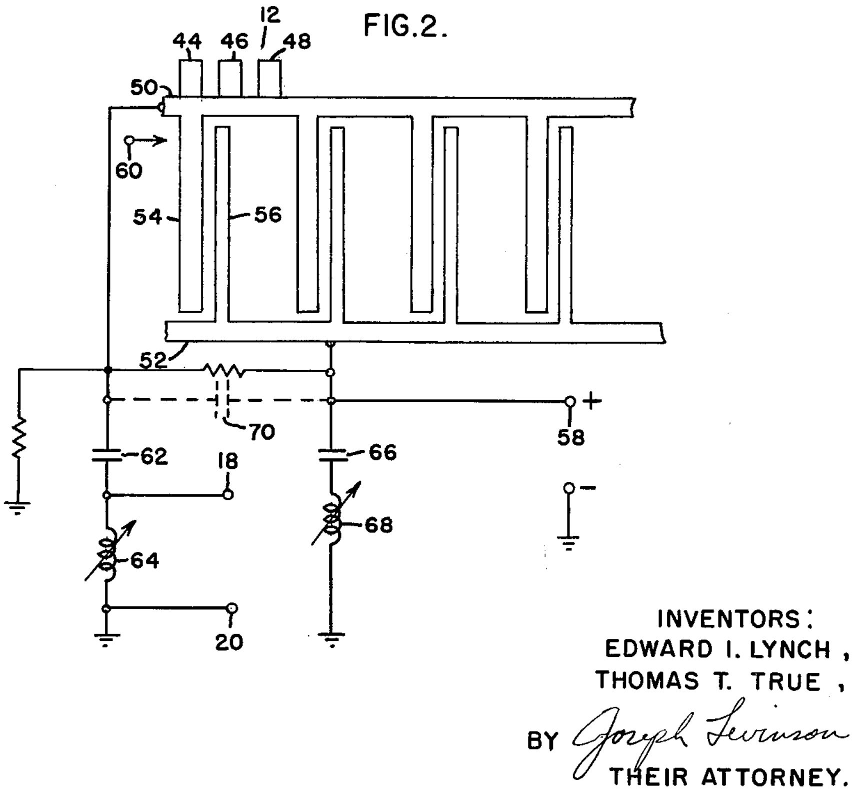

This invention will be more clearly understood by reference to the following detailed description taken in combination with the accompanying drawings, of which:

FIGURE 1 is a schematic diagram of a cathode ray tube system in accordance with this invention; and FIGURE 2 is an enlarged plan view of the tube face of the cathode ray tube shown in FIGURE 1 with the utilizing circuit illustrated in schematic form.

In FIGURE 1 there is shown a cathode ray tube 10 having a tube face 12 on the inner side of which is imprinted a plurality of vertically-extending, laterally-displaced color triads 14. The color triads consist of three vertical phosphor stripes each of which is a luminescent material to generate light of a specific primary color in response to excitation by an impinging beam of electrons.

The electron beam is generated by the conventional gun and deflected in the scanning raster by conventional deflection yokes (not illustrated). The electron beam is modulated by the signal applied to a modulation grid 16. As the electron beam is swept over the tube face the modulation of the beam will excite the phosphors to generate an image representation of the video signal in conventional fashion. In addition, the index signal, related to the position of impingement of the electron beam, is derived across terminals 18 and 20.

The signal control loop is conventional in that the index signal, after amplification by the amplifier 22, is applied to mixer 26 over lead 24 and is therein heterodyned with the reference carrier signal regenerated from the NTSC signal and applied to mixer 26 over lead 28. The sum component of the heterodyned output is then mixed with the chroma signal in mixer 32 to which it is applied over lead 30 and to which the chroma signal is applied over lead 34. The difference component which is a dot-sequential chrominance signal at triad rate frequency, is applied to adder 38 over lead 36 for linear addition thereto of the luminance signal applied to the adder over lead 40. The composite signal, now containing the luminance signal and the dot-sequential chrominance signal, is applied to the writing grid 16 over lead 42. Beam position phase information is included in the dot-sequential chrominance signal.

The structure of the cathode ray tube insofar as it relates to generation of the index signal and the derivation of the index signal from the cathode ray tube may best be understood by reference to FIGURE 2 which is a plan view of the tube face to greatly enlarged scale.

In FIGURE 2 there is shown the tube face 12 upon which is imprinted vertical triads comprising a triplet of phosphor stripes 44, 46 and 48 of the respective primary colors. Over the phosphors there is applied an emitter comb 50 and a collector comb 52. The teeth of the two combs are interlaced as shown. Each of the combs is a thin, electron-permeable material. The material may be, for example, aluminum. However, since use is made of secondary emission electrons, other materials having higher secondary emission characteristics may be used provided that the material is conductive and preferably of low resistance.

The emitter comb is provided with a plurality of relatively wide teeth 54 coupled together by the comb structure 50. The collector comb is provided with relatively narrow teeth 56 electrically connected together in a comb 52. To construct the combs the comb material may be placed directly over the phosphors and etched to form the comb teeth structure shown.

The collector comb is biased positively with respect to the emitter comb by a voltage supply coupled to terminal 58. As the writing beam, represented by circle 60 sweeps across the tube face in a scanning raster, it will strike the teeth 54 of the emitter comb. The comb teeth are thin and do not interfere with the energizing of the color phosphors. However, some of the energy of the electrons of the electron beam will terminate in the comb structure releasing secondary electrons therefrom. The bias applied to the collector teeth 56 will generate an electrostatic field between the collector and emitter teeth to remove the electrons. In this manner, the electrons emitted from the emitter will not form a cloud to prevent release of other electrons but will generate a current between emitter and collector combs. Since the secondary electrons are of relatively low velocity, they will not pass through the collector comb to spuriously activate the phosphors on the face of the tube.

The circuit used to remove the indexing signal from the tube is also shown in FIGURE 2 and comprises a capacitor 62 serially connected with a variable inductor 64 between ground and the emitter comb. Similarly, coupled between ground and the collector comb is a capacitor 66 and a variable inductance 68. The series resonant trap from the collector electrode comprising capacitor 66 and inductance 68 is required to provide a low impedance path to ground. The variable inductors are adjusted simultaneously for maximum signal output and minimum spurious pick up (e.g. ringing produced by the horizontal flyback pulse). The capacitance between the two teeth can be represented by the capacitor illustrated in dotted line as capacitor 70.

In the embodiment illustrated, a high amplitude output was obtained with normal electron beam currents. By variation of the components the output voltage amplitude can be adjusted within quite a wide range dependent upon the bandwidth of the utilizing equipment, and the beam currents limited by the application intended. Similarly, the scan rate and comb tooth pitch will determine the frequency of the indexing signal which is preferably above twice the video frequencies.

Thus it can be seen that there is provided a structure on the face of the tube to properly utilize the secondary emission phenomenom of the comb teeth. The emitter comb releases secondary electrons. The established electrostatic field, which is the same on each tooth of the comb, removes the electrons generated by the emitter to generate an index signal related properly to actual position of the impinging electron beam. The index signal current is established into the comb from external circuitry. A balanced output circuit can then be used giving good immunity to spurious pick up. The transit time of the electrons is maintained constant and very short in time so that the phase of the index signal will accurately represent the positional information corresponding to the actual position of impingement of the electron beam. This is quite important since if the transit time is allowed to vary, phase to position correlation of the index signal is lost.

It will further be noted that it is possible to fabricate the teeth of the same width. However, it is found advisable to make the emitter tooth wider than the collector tooth to give increased index signal output. Also, the teeth areas and pitch may be so proportioned that all phosphor areas are covered by aluminum backing to increase light output.

Further, it is often desirable to fabricate the combs of dissimilar materials. The emitter comb can be constructed from material which emits secondary electrons readily with the collector being fabricated from a material which is a poor emitter. With such arrangement the indexing signal structure may be likened to a single stage electron multiplier and the secondary electron current may be several times larger than the original writing beam current.

This invention may be variously embodied and modified within the scope of the subjoined claims.

What is claimed is:

1. An apparatus for the generation of an indexing signal in a cathode ray tube comprising: an emitter comb of thin electron-permeable material which emits secondary electrons when struck by an electron beam, said comb having a plurality of teeth positioned on and repetitively spaced across a viewing face of the picture tube for being struck by an electron beam of the picture tube when the beam is deflected in a scanning raster; means for removing secondary electrons emitted by said comb including a collector comb positioned on the viewing face of the tube having teeth interleaved with said emitter comb teeth, means establishing a constant electrostatic field between said emitter and collector combs for causing secondary electrons to flow from said emitter to said collector comb; and circuit means coupled to one of said combs for providing an electrical signal indicative of the position of beam impingement on the viewing face.

2. A combination in accordance with claim 1 in which said first comb is constructed of material having good secondary emission characteristics.

3. In combination an emitter comb, a collector comb, the teeth of said emitter and collector combs being interlaced, means for biasing said collector comb positively with respect to said emitter comb, a first tuned circuit coupled between said collector comb and ground, a second tuned circuit coupled between said emitter comb and ground, and means for deriving a signal from said second tuned circuit.

References Cited in the file of this patent

UNITED STATES PATENTS

| | | |
|---|---|---|
| 2,757,313 | Miller | July 31, 1956 |
| 2,767,346 | Hoyt | Oct. 16, 1956 |
| 2,771,504 | Moore et al. | Nov. 20, 1956 |
| 2,916,664 | Sternglass | Dec. 8, 1959 |
| 3,018,405 | Oxenham | Jan. 23, 1962 |